United States Patent [19]
Beal et al.

[11] Patent Number: 5,741,351
[45] Date of Patent: Apr. 21, 1998

[54] APPARATUS AND METHOD FOR CLEANING AN AIR FILTER OF A VEHICLE

[75] Inventors: Ronald C. Beal, Pekin; Duane K. Edwards, East Peoria; John Styfhoorn, Dunlap, all of Ill.

[73] Assignee: Caterpillar Inc., Peoria, Ill.

[21] Appl. No.: 732,797

[22] Filed: Oct. 15, 1996

[51] Int. Cl.⁶ .................. B01D 46/04; B01D 29/68
[52] U.S. Cl. .................. 95/279; 55/291; 55/293; 55/302; 55/385.3
[58] Field of Search .................. 55/289, 290, 291, 55/293, 294, 300, 302, 284, 285, 385.3; 95/278, 279, 280

[56] References Cited

U.S. PATENT DOCUMENTS

| | | | |
|---|---|---|---|
| 702,312 | 6/1902 | Mitchell | 55/285 |
| 2,823,656 | 2/1958 | Dolza | 55/302 X |
| 3,251,175 | 5/1966 | Black, Jr. | 55/302 X |
| 3,402,881 | 9/1968 | Moore et al. | 55/302 X |
| 3,472,002 | 10/1969 | Brown et al. | 55/302 X |
| 3,966,441 | 6/1976 | Freze | 55/302 X |
| 3,977,847 | 8/1976 | Clark | 55/302 X |
| 4,222,754 | 9/1980 | Horvat | 55/284 X |
| 4,277,264 | 7/1981 | Buchholz et al. | 55/294 |
| 4,377,401 | 3/1983 | Laughlin | 55/302 X |
| 4,506,625 | 3/1985 | Vöhringer | 55/302 X |
| 4,622,050 | 11/1986 | O'Connor | 55/302 X |
| 4,826,512 | 5/1989 | Fuller | 55/302 X |
| 4,830,642 | 5/1989 | Tatge et al. | 55/285 X |
| 4,842,624 | 6/1989 | Barton | 55/294 |
| 5,143,529 | 9/1992 | Means, Jr. | |
| 5,205,847 | 4/1993 | Montieth et al. | 55/302 X |
| 5,584,900 | 12/1996 | Zaiser et al. | 55/293 |

FOREIGN PATENT DOCUMENTS 2198058  6/1988  United Kingdom .......... 55/302

*Primary Examiner*—Robert Spitzer
*Attorney, Agent, or Firm*—Maginot & Addison

[57] ABSTRACT

An apparatus for cleaning a filter includes a support frame and a turn table for supporting the filter, wherein the turntable rotates in relation to the support frame during a filter cleaning operation. The apparatus also includes an air flow director for directing a flow of air against the filter, wherein the air flow director is fixed in relation to the support frame during the filter cleaning operation. A method of cleaning a filter is also disclosed.

17 Claims, 6 Drawing Sheets

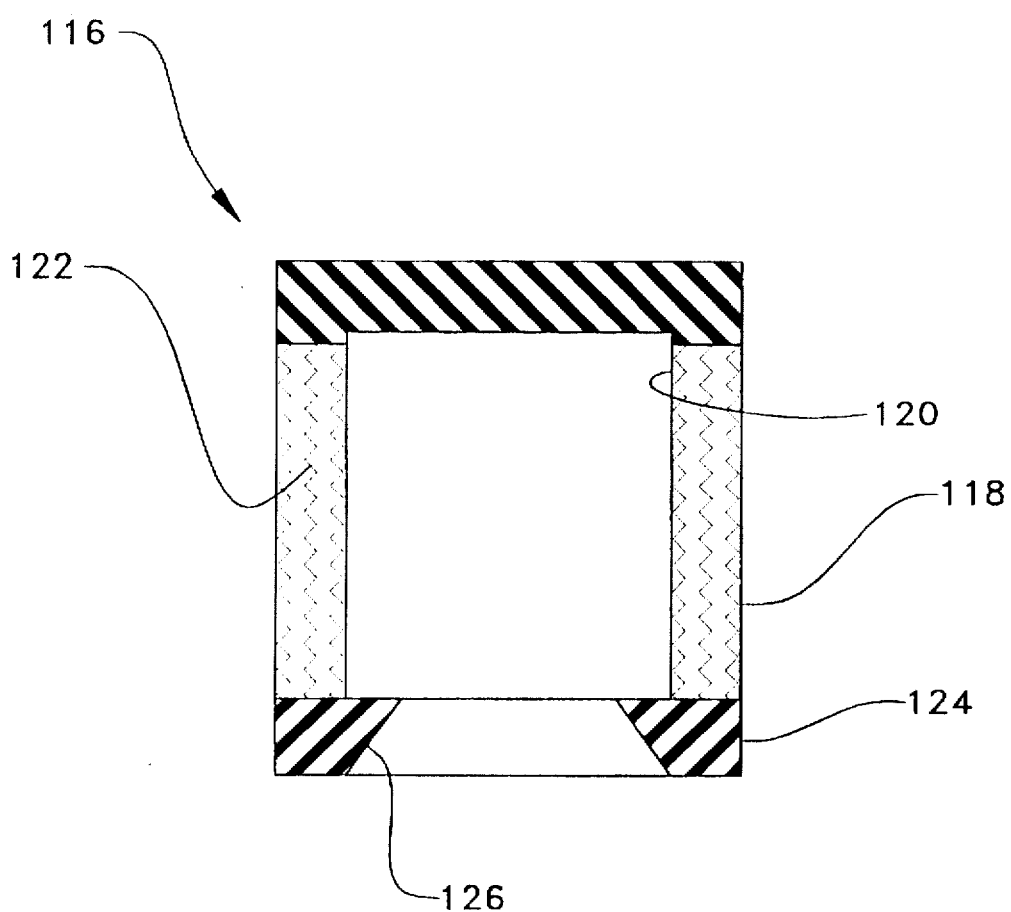
Fig_5_

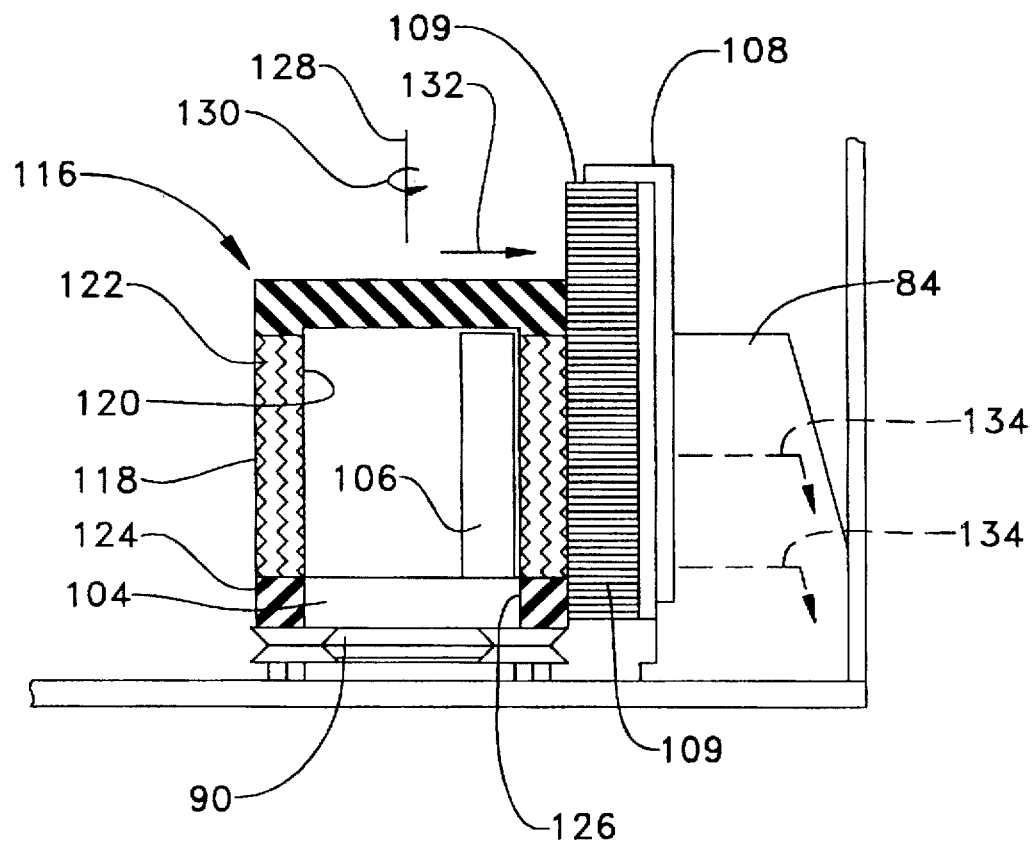

APPARATUS AND METHOD FOR CLEANING AN AIR FILTER OF A VEHICLE

BACKGROUND OF THE INVENTION

The present invention relates generally to an apparatus and method for cleaning a filter, and more particularly to an apparatus and method for cleaning an air filter of a vehicle.

Internal combustion engines, gas turbines, and other devices which require an inflow of source air (hereinafter "air breathing machines") are subject to damage from dirt, grit and the like contained within such inflow of source air. Therefore, these types of machines must have an inflow of source air that is substantially free of grit and debris. Typically, air breathing machines utilize air filters to remove grit and other debris from source air drawn into these machines.

Air filters typically include inner and outer wire mesh or perforated metal screens, with filter paper interposed therebetween. The filter paper is formed to allow the passage of air therethrough, while trapping the dirt and grit particles suspended in the air. The filter paper is typically corrugated in order to provide a large surface area for the passage of air and the entrapment of the suspended dirt and grit particles.

Over a period of time air filters can become fouled with the entrapped dirt and grit particles. Therefore, air filters require periodic cleaning or replacement. Typically, air filters are expensive, and thus their repeated replacement is undesirable. This is especially true when the air breathing machine is operated in a dirty or dusty environment, such as mining or other earth working environments.

The cleaning of air filters has heretofore largely depended upon the use of compressed air to blow the trapped dirt and grit particles out of the filter paper. However, the use of compressed air has the disadvantage of being relatively expensive. Moreover, the use of compressed air tends to damage the filter being cleaned due to the high velocity of the flow of air that is advanced against the air filter. This is especially true after repeated cleaning operations performed on the air filter.

It would therefore be desirable to provide an apparatus and method for cleaning an air filter that is inexpensive. It would further be desirable to provide an apparatus and method for cleaning an air filter in a fast and efficient manner. It would also be desirable to provide an apparatus and method for cleaning an air filter that causes less damage to the air filter being cleaned.

SUMMARY OF THE INVENTION

The above and other objects, features, and advantages of the present invention will become apparent from the following description and the attached drawings.

In accordance with one embodiment of the present invention an apparatus for cleaning a filter is provided. The apparatus includes a support frame and a turn table for supporting the filter, wherein the turntable rotates in relation to the support frame during a filter cleaning operation. The apparatus also includes an air flow director for directing a flow of air against the filter, wherein the air flow director is fixed in relation to the support frame during the filter cleaning operation.

In accordance with another embodiment of the present invention there is provided a method for cleaning a filter. The method includes the steps of supporting a turn table and an air flow director with a support frame. Supporting the filter on the turn table. Directing a flow of air against the filter with the air flow director. Rotating the turn table in relation to the support frame. Maintaining the air flow director fixed in relation to the support frame during the rotating step.

It is therefore an object of this invention to provide a new and useful apparatus and method for cleaning an air filter of a vehicle.

It is a further object of this invention to provide an improved apparatus and method for cleaning an air filter of a vehicle.

It is another object of this invention to provide an apparatus and method for cleaning an air filter that is inexpensive.

It is still another object of this invention to provide an apparatus and method for cleaning an air filter in a fast and efficient manner.

It is yet another object of this invention to provide an apparatus and method for cleaning an air filter that causes less damage to the air filter being cleaned.

BRIEF DESCRIPTION OF THE DRAWINGS

FIG. 5 is a cross sectional view of an air filter;

FIG. 6 is a front elevational view of the cleaning assembly shown in FIG. 2, having an air filter supported on the turn table, with the air filter shown in cross section for clarity of description.

DETAILED DESCRIPTION OF THE PREFERRED EMBODIMENT

Figure 1:
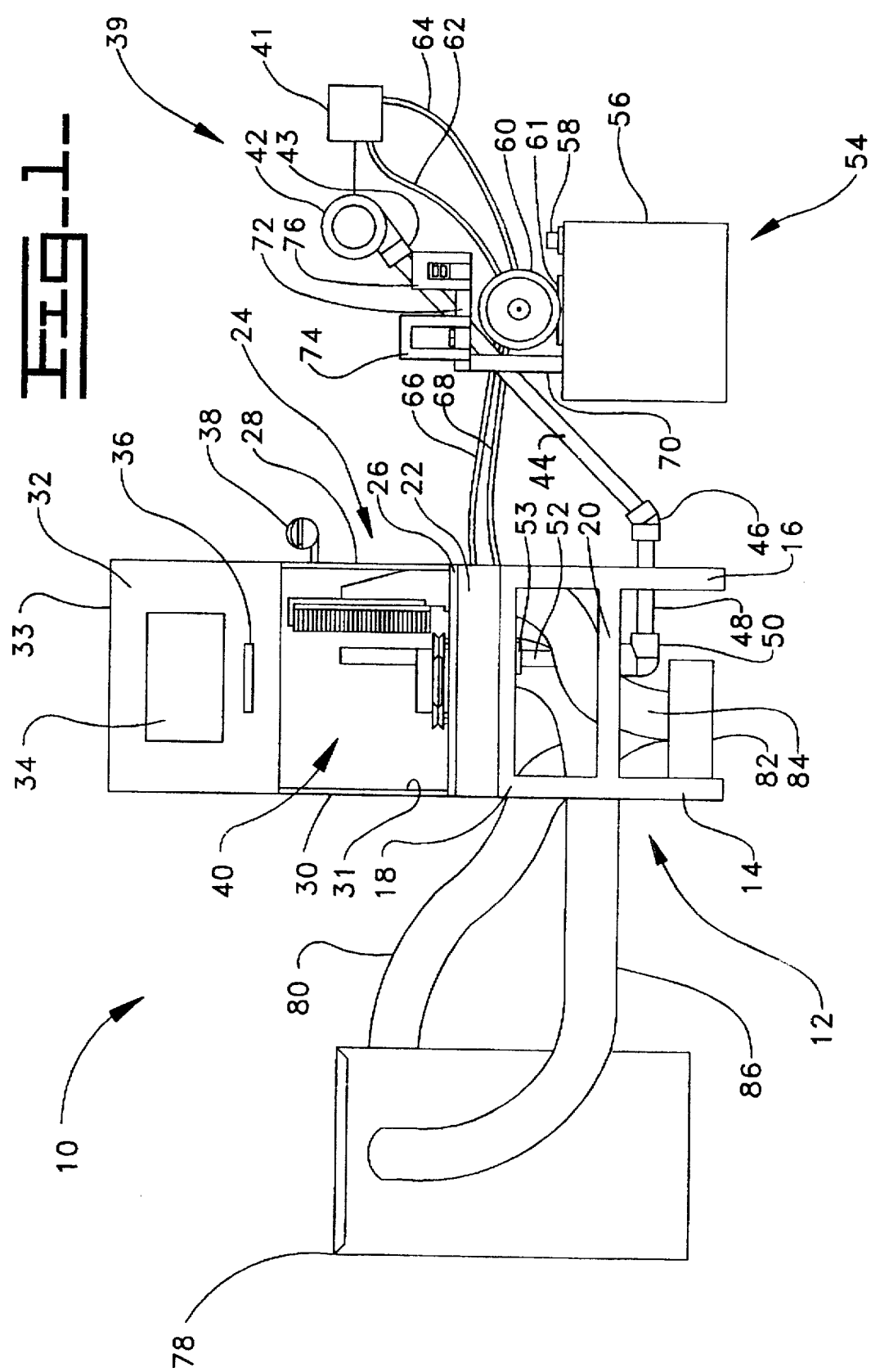
FIG. 1 is a front elevational view of a filter cleaning apparatus which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a filter cleaning apparatus 10 which incorporates the features of the present invention therein. Filter cleaning apparatus 10 includes a support frame 12, a cleaning enclosure 24 and a cleaning assembly 40. The support frame 12 supports the cleaning enclosure 24 and the cleaning assembly 40. The cleaning assembly 40 is contained within the cleaning enclosure 24. Cleaning apparatus 10 also includes an air flow generator 39 in fluid communication with cleaning assembly 40. Cleaning apparatus 10 further includes a vacuum source 78 in fluid communication with cleaning assembly 40.

Support frame 12 includes a front pair of vertically extending support members 14 and 16. Support frame 12 also includes a back pair of vertically extending support members (not shown) positioned directly behind vertically extending support members 14 and 16.

Vertically extending members 14 and 16 are connected together by a top horizontal frame member 18 and a middle horizontal frame member 20. Similarly, the back pair of vertically extending support members 14 and 16 are connected together by another horizontal frame member (not shown). A base member 22 is secured to and supported by top horizontal frame member 18. It should be understood that base member 22 is also secured to and supported by the top horizontal frame member connecting the back pair of vertically extending support members. Therefore, support frame 12 is a generally vertically extending structure having a rectangular box-like construction.

Cleaning enclosure 24 is secured to base member 22. Cleaning enclosure 24 includes a generally rectangular shaped floor member 26 mounted on base member 22. Cleaning enclosure 24 has two generally rectangular shaped side panels 28 and 30 upwardly extending from opposite parallel edges of floor member 26. Cleaning enclosure 24 also has a back panel (not shown) upwardly extending from a third edge of floor member 26. The back panel is interposed between and connected to side panels 28 and 30. Thus, floor member 26, side panel 28, side panel 30 and the back panel define a generally box-shaped receptacle 31.

A door panel 32, having a handle 36 thereon is also provided. An edge of a ceiling panel (not shown) is secured to an edge 33 of door panel 32 with a hinge (not shown). Another edge of the ceiling panel, opposite to the edge secured to door panel 32, is secured to an upper edge (not shown) of the back panel (not shown). The above described construction allows door panel 32 to be positioned in an open position as shown in FIG. 1. The open position allows access to receptacle 31. Door panel 32 can also be moved downward from the open position to a closed position which restricts access to receptacle 31. In the closed position, door panel 32 rests against side panels 28 and 30, and floor member 26. The closed position is not shown in FIG. 1. A window 34 is mounted in door panel 32 such that a visual inspection of receptacle 31 is possible when door panel 32 is in the closed position.

Cleaning assembly 40 is supported by floor member 26 and contained within receptacle 31. As more clearly illustrated in FIG. 2, cleaning assembly 40 includes a support element 88 mounted onto floor member 26. An annular turn table 90 for supporting a filter 116 (see FIGS. 5 and 6) is secured to support element 88. Turn table 90 is secured to support element 88 such that turn table 90 can rotate in relation to support frame 12 during a filter cleaning operation.

Figure 2:
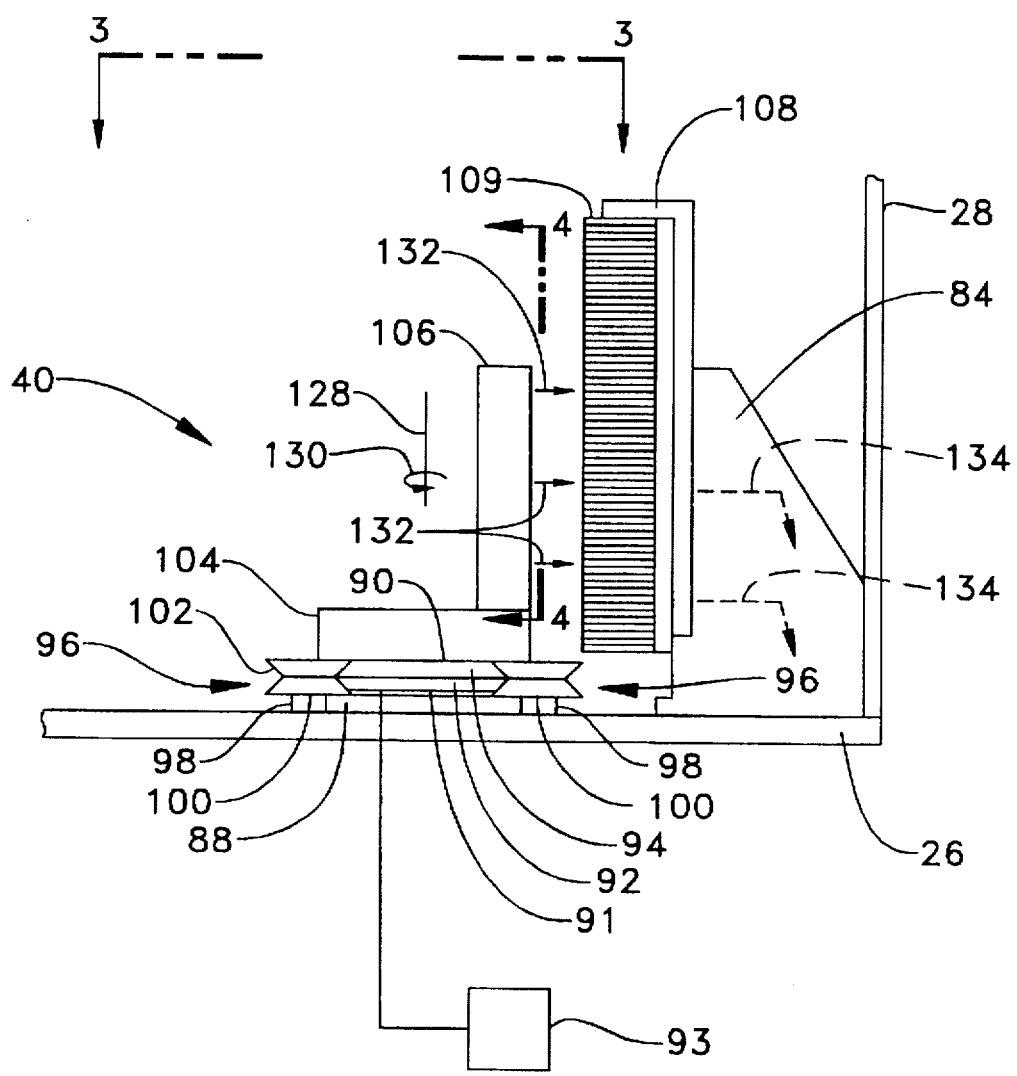
FIG. 2 is an enlarged front elevational view of the cleaning assembly shown in FIG. 1, with a portion of the cleaning enclosure removed for clarity of description.

Turn table 90 includes a first circumferential beveled edge 92 and a second circumferential beveled edge 94. Turn table 90 also includes an annular drive member 91 secured thereto, adjacent to first circumferential beveled edge 92. As schematically shown in FIG. 2, drive member 91 is preferably operatively linked to a hydraulic motor 93 for rotating turn table 90 around longitudinal axis 128 in the direction indicated by arrow 130 during a filter cleaning operation. Note that hydraulic motor 93 is mounted to floor member 26 behind turn table 90. However, it should be understood that turn table 90 could also be rotated around longitudinal axis 128 in a direction opposite to the direction indicated by arrow 130 during a filter cleaning operation. It should also be understood that an electric motor could be used to rotate turn table 90.

Figure 3:
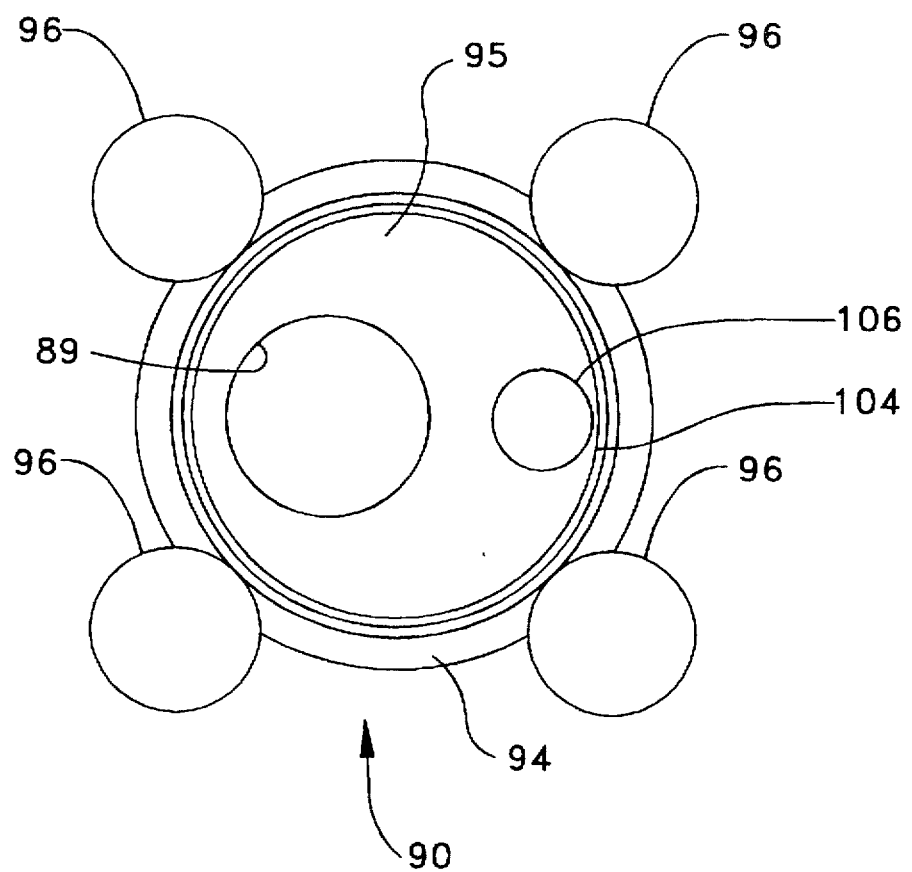
FIG. 3 is an elevational view of the cleaning assembly taken along line 3—3 of FIG. 2 with the vacuum inlet and floor member removed for clarity of description.

Four spindles 96 are spaced around turn table 90 as shown in FIG. 3. (note that only two spindles are shown in FIG. 2). Spindles 96 each have a shaft 98 secured to floor member 26.

Shafts 98 rotatably support a roller portion 100 above floor member 26. Each roller portion 100 has a v-shaped groove 102 formed therein. Spindles 96 are positioned around turn table 90 such that each v-shaped groove 102 is in contact with first circumferential beveled edge 92 and second circumferential beveled edge Having each v-shaped groove 102 in contact with first circumferential beveled edge 92 and second circumferential beveled edge 94 allows roller portion 100 to rotate along with, and help support, turn table 90 as it is being rotated by hydraulic motor 93 during a filter cleaning operation.

A concentric annular flange 104 extends upwardly from turn table 90. Annular flange 104 is fixed with bolts in relation to turn table 90 such that it rotates with turn table 90 around longitudinal axis 128 in the direction indicated by arrow 130 during a filter cleaning operation. Annular flange 104 extends to a certain height above turn table 90, and has an appropriate diameter, such that a rubber gasket 124 of filter 116 (see FIGS. 5 and 6) can be mounted over annular flange 104. It should be understood that annular flange 104 can be removed from turn table 90 and replaced with a different size flange. The size of the replacement flange depends upon the size of the filter to be cleaned.

Cleaning assembly 40 further includes an air flow director 106 for directing a flow of air against filter 116 (see FIGS. 5 and 6). What is meant herein by the term "air" is any gaseous fluid. Air flow director 106 is secured to a pipe 52 (see FIG. 1). However, it should be understood that air flow director 106 can be removed from pipe 52 and replaced with a different size air flow director. The size of the replacement air flow director depends upon the height of the filter to be cleaned. The air flow director 106 and is fixed in relation to support frame 12 during a filter cleaning operation. Air flow director 106 extends in a upwardly direction through, and is partially surrounded by, turn table 90 and flange 104.

Figure 4:
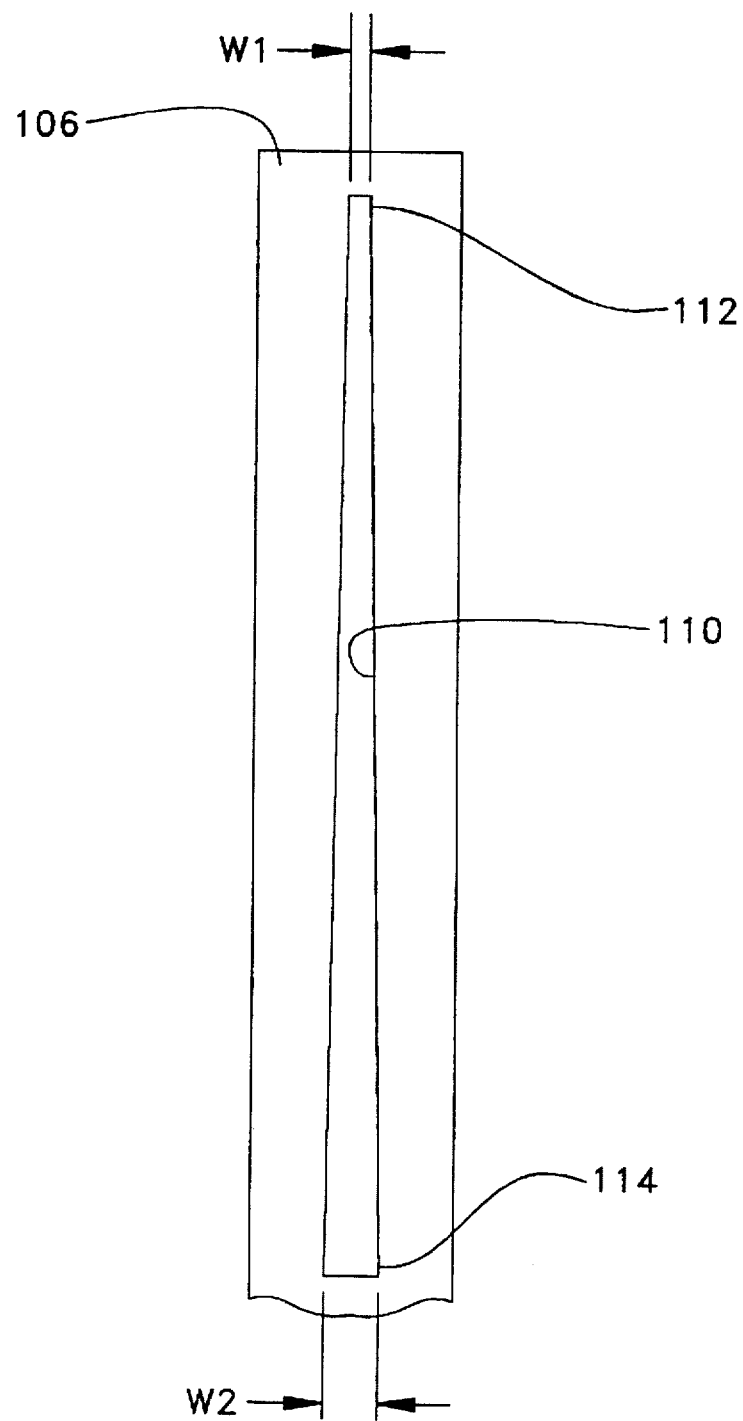
FIG. 4 is an elevational view of the air flow member taken along line 4—4 of FIG. 2.

As shown in FIG. 4, air flow director 106 defines an elongated slot 110 through which the flow of air advances. Preferably, a first end 112 of slot 110 has a first width W1 and a second end 114 of slot 110 has a second width W2 such that slot 110 tapers in width from second end 114 to first end 112. Moreover, it is preferred that first width W1 and second width W2 have a relationship which is defined approximately as follows:

$$W2=2\times W1.$$

The air flow director 106 is oriented with respect to turn table 90 such that first end 112 of slot 110 is further away in distance from pipe 52 (see FIG. 1) which is supplying air to air flow director 106.

The above described shape and position of slot 110 causes a filter paper 122 (see FIGS. 5 and 6) contained within filter 116 to shake or vibrate when the air flow from air flow director 106 impinges upon filter 122. The shaking of filter paper 122 in the above described manner is an important aspect of the present invention since the air flow and the shaking facilitates cleaning of filter 116.

As shown in FIG. 2, cleaning assembly 40 further includes a vacuum inlet 108. Vacuum inlet 108 is secured to a conduit 84 that is attached to floor member 26. Vacuum inlet 108 is positioned relative to air flow director 106 so as to receive an air flow exiting slot 110 of air flow director 106 in the direction indicated by arrows 132. Note that the distance between air flow director 106 and vacuum inlet 108 is exaggerated in FIG. 2 for clarity of description. The vacuum inlet 108 has a hole (not shown) defined therein through which the flow of air advances. The hole has a set of brushes 109 along at least one side thereof. Brushes 109 extend from the side of the hole such that they contact an exterior sidewall surface 118 of filter 116 during a cleaning operation as shown in FIG. 6. Brushes 109 may be stationary or alternatively they may be rotated during a filter cleaning operation.

Now referring back to FIG. 1, filter cleaning apparatus 10 further includes an air flow generator 39 having a hydraulic power unit 54 and a turbocharger engine component 42. An example of a turbocharger engine component that can be used in the present invention is Caterpillar part number OR-4910, available from Caterpillar Inc., Peoria, Ill. Turbocharger engine component 42 generates the air flow which is advanced to air flow director 106.

Hydraulic power unit 54 has an electric motor 60 supported on a bracket 61 that is mounted on a hydraulic fluid tank 56. Hydraulic fluid tank 56 includes a cap 58 which is removed when filling hydraulic fluid tank 56 with an appropriate amount of hydraulic fluid.

A hydraulic pump (not shown) is secured to the back side of electric motor 60. The hydraulic pump is direct shafted to electric motor 60 in a well known manner such that electric motor 60 drives the hydraulic pump. A first pair of hydraulic hoses 62 and 64 extend from the hydraulic pump and connect to a hydraulic motor 41 (shown schematically in FIG. 1) to form a well known hydraulic circuit for driving hydraulic motor 41.

Hydraulic motor 41 is direct shafted in a well known manner to turbocharger engine component 42 to drive the same. Note that the direct shafting of hydraulic motor 41 to turbocharger engine component 42 is shown schematically in FIG. 1. Alternatively, turbocharger engine component 42 can be driven by a gas powered motor.

Turbocharger engine component 42 is attached to a pipe 44 via joint 43. Pipe 44 is attached to pipe 48 via joint 46. Pipe 48 is attached to pipe 52 via joint 50. Pipe 52 is secured to base member 22 by bracket 53. Pipe 52 extends up through base member 22, floor member 26 and support element 88 (see FIG. 2) and is connected to air flow director 106 (see FIG. 2). It should be understood that the above described arrangement of pipes 44, 48 and 52 defines a conduit interposed between turbocharger engine component 42 of air flow generator 39 and air flow director 106. This conduit places turbocharger engine component 42 in fluid communication with air flow director 106 for providing the flow of air thereto.

An air compressor (not shown) can be substituted for turbocharger engine component 42 for providing the air flow to air flow director 106. However, utilizing turbocharger engine component 42 provides significant advantages. For example, turbocharger engine component 42 is less expensive to use than the air compressors typically used to provide an air flow in filter cleaning apparatus.

A second pair of hydraulic hoses 66 and 68 extend from the hydraulic pump secured to the back of electric motor 60. Hydraulic hoses 66 and 68 are connected to hydraulic motor 93 (not shown in FIG. 1; shown schematically in FIG. 2). The hydraulic pump, hydraulic hoses 66 and 68, and hydraulic motor 93 form a well known hydraulic circuit for driving hydraulic motor 93. As discussed above in reference to FIG. 2, hydraulic motor 93 is operatively linked to turn table 90 for turning the same during a filter cleaning operation.

Air flow generator 39 further includes a vertical arm 70 extending from hydraulic fluid tank 56. An end of vertical arm 70 is connected to horizontal arm 72. Horizontal arm 72 supports a control panel 74 which controls the functions of air flow generator 39 (e.g. the on-off operation of the electric motor 60).

As shown in FIG. 1, vacuum source 78 includes first conduit 84 connected to vacuum inlet 108 (see FIG. 2) and a second conduit 80 connected to vacuum source 78. A particle box 82 is interposed between first conduit 84 and second conduit 80 for trapping any relatively large particles received by vacuum inlet 108 (see FIG. 2). It should be understood that the above described arrangement of first conduit 84, second conduit 80 and particle box 82 keeps vacuum inlet 108 in fluid communication with vacuum source 78.

Horizontal arm 72 supports a control panel 76 which controls the functions of vacuum source 78 (e.g. the on-off operation of the vacuum source).

Also shown in FIG. 1, is vacuum gauge 38 connected to side panel 28. When filter 116 is mounted on flange 104 and supported on turn table 90, vacuum gauge 38 measures the pressure drop across filter 116. The pressure drop is measured after a filter cleaning operation has been completed (i.e. when air flow generator 39 is turned off), and while a vacuum is being pulled through conduit 86. Conduit 86 is in fluid communication with a hole 89 (see FIG. 3) formed in top surface 95 (see FIG. 3) of support element 88. Measuring the pressure drop across filter 116 allows an operator to determine the cleanliness of filter 116 after a filter cleaning operation.

Now referring to FIGS. 5 and 6, there is shown a cross sectional view of cylindrical filter 116. Filter 116 includes an exterior sidewall surface 118 and an interior sidewall surface 120. Interposed between exterior sidewall surface 118 and interior sidewall surface 120 is filter paper 122. Filter 116 also includes rubber flange 124 which defines an opening 126 in the filter.

As shown in FIG. 6, during a filter cleaning operation, filter 116 is mounted on flange 104 through opening 126 of the filter. Note that opening 126 is defined by rubber gasket 124 of the filter 116. Once filter 116 is mounted in the above described manner, air flow generator 39 is actuated causing the flow of air to exit slot 110 (see FIG. 4). The flow of air advances through filter 116 in the direction indicated by arrow 132. Actuating air flow generator 39 also causes turn table 90 to rotate around longitudinal axis 128 in a direction indicated by arrow 130. Rotation of the turn table 90 causes filter 116 to rotate around longitudinal axis 128 in the direction indicated by arrow 130. Rotating filter 116 in this manner allows the air flow to impact the entire interior sidewall surface 120 of filter 116.

Vacuum source 78 is also actuated at the same time as air flow generator 39. Vacuum inlet 108 receives the flow of air which is advanced out of the air flow director 106 as indicated by arrows 134. Note that any debris dislodged from the filter 116 due to the flow of air striking the filter is advanced into the vacuum inlet 108 for advancement through conduit 84.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

We claim:

1. A method for cleaning a filter, comprising the steps of:
   supporting a turn table and an air flow director with a support frame;
   supporting said filter on said turn table;
   directing a flow of air against said filter with said air flow director;

rotating said turn table in relation to said support frame during an entire filter cleaning operation;

maintaining said air flow director fixed in relation to said support frame during said entire filter cleaning operation; and generating said flow of air with an air flow generator having a turbocharger engine component.

2. The method of claim 1, further comprising said step of powering said turbocharger engine component with a hydraulic motor.

3. A method for cleaning a filter, comprising the steps of:

supporting a turn table and an air flow director with a support frame;

supporting said filter on said turn table;

directing a flow of air against said filter with said air flow director;

rotating said turn table in relation to said support frame during an entire filter cleaning operation;

maintaining said air flow director fixed in relation to said support frame during said entire filter cleaning operation, wherein said air flow director defines an elongated slot, further comprising the step of:

advancing said flow of air through said elongated slot.

4. The method of claim 3, wherein:

a first end of said elongated slot has a first width (W1);

a second end of said elongated slot has a second width (W2) which is greater than said first width (W1); and said elongated slot tapers in width from said second end to said first end.

5. An apparatus for cleaning a filter, comprising:

a support frame:

a turn table for supporting said filter, wherein said turntable rotates in relation to said support frame during an entire filter cleaning operation:

an air flow director for directing a flow of air against said filter, wherein said air flow director is fixed in relation to said support frame during said entire filter cleaning operation:

an air flow generator for generating said flow of air; and a conduit interposed between said air flow director and said air flow generator such that said air flow generator is in fluid communication with said air flow director, wherein said air flow generator includes a turbocharger engine component.

6. The apparatus of claim 5, wherein said turbocharger engine component is powered by a hydraulic motor.

7. The apparatus of claim 5, wherein:

said air flow director defines an elongated slot through which said flow of air advances;

a first end of said elongated slot has a first width (W1);

a second end of said elongated slot has a second width (W2) which is greater than said first width (W1);

said elongated slot tapers in width from said second end to said first end; and said first end of said slot is further away in distance from said conduit than said second end of said slot.

8. An apparatus for cleaning a filter, comprising:

a support frame;

a turn table for supporting said filter, wherein said turntable rotates in relation to said support frame during an entire filter cleaning operation; and an air flow director for directing a flow of air against said filter, wherein said air flow director is fixed in relation to said support frame during said entire filter cleaning operation, wherein said air flow director defines an elongated slot through which said flow of air advances.

9. The apparatus of claim 8, wherein:

a first end of said elongated slot has a first width (W1);

a second end of said elongated slot has a second width (W2) which is greater than said first width (W1); and said elongated slot tapers in width from said second end to said first end.

10. The apparatus of claim 9, wherein said first width and said second width have a relationship which is defined approximately as follows:

$$W2 = 2 \times W1.$$

11. The apparatus of claim 8, further comprising a vacuum inlet for receiving said flow of air exiting said air flow director, wherein said filter is interposed between said vacuum inlet and said air flow director.

12. The apparatus of claim 11, further comprising:

a vacuum source; and a conduit interposed between said vacuum inlet and said vacuum source such that said vacuum inlet is in fluid communication with said vacuum source.

13. The apparatus of claim 12, wherein said conduit includes (1) a first conduit segment connected to said vacuum inlet, and (2) a second conduit segment connected to said vacuum source, further comprising:

a particle box interposed between said first conduit segment and said second conduit segment.

14. The apparatus of claim 8, further comprising a cleaning enclosure supported by said support frame, wherein said cleaning enclosure contains said turn table and said air flow director during said filter cleaning operation.

15. The apparatus of claim 8, wherein:

said filter includes an interior sidewall surface, and said air flow director directs said flow of air against said interior sidewall surface of said filter.

16. The apparatus of claim 8, further comprising a hydraulic motor for rotating said turn table in a circular path of movement.

17. The apparatus of claim 8, wherein said turn table and said air flow director are supported by said support frame.

* * * * *